United States Patent [19]

Laufer et al.

[11] Patent Number: 4,535,742
[45] Date of Patent: Aug. 20, 1985

[54] FUEL INJECTION PUMP FOR INTERNAL COMBUSTION ENGINES

[75] Inventors: Helmut Laufer; Helmut Pfeifle; Max Straubel, all of Stuttgart, Fed. Rep. of Germany

[73] Assignee: Robert Bosch GmbH, Stuttgart, Fed. Rep. of Germany

[21] Appl. No.: 595,189

[22] Filed: Mar. 30, 1984

[30] Foreign Application Priority Data

May 19, 1983 [DE] Fed. Rep. of Germany ....... 3318236

[51] Int. Cl.³ .......................................... F02M 39/00
[52] U.S. Cl. ..................................... 123/447; 123/506
[58] Field of Search ............... 123/447, 449, 450, 457; 417/289

[56] References Cited

U.S. PATENT DOCUMENTS

| | | | |
|---|---|---|---|
| 3,592,568 | 7/1971 | Fenne | 123/447 |
| 3,724,436 | 4/1973 | Nagata et al. | 123/506 |
| 3,759,239 | 9/1973 | Regneault et al. | 123/447 |
| 4,401,082 | 8/1983 | Leblanc | 123/447 |
| 4,409,939 | 10/1983 | Eheim et al. | 123/447 |
| 4,449,504 | 5/1984 | Furuhashi et al. | 123/447 |

FOREIGN PATENT DOCUMENTS

2841807 4/1980 Fed. Rep. of Germany ...... 123/449
3118669 4/1982 Fed. Rep. of Germany ...... 123/458

Primary Examiner—Magdalen Y. C. Moy
Attorney, Agent, or Firm—Edwin E. Greigg

[57] ABSTRACT

A fuel injection pump for internal combustion engines, in which beyond a predetermined remnant stroke during the supply stroke of the pump piston a relief conduit is opened via a first control edge and the remaining fuel pumped by the pump piston is pumped into a reservoir connected there. During the subsequent intake stroke, the diverted fuel is pumped back into the pump work chamber of the pump piston, until the first control edge again closes the relief conduit. During the subsequent intake stroke of the pump piston, in particular at the bottom dead center position of the pump piston, the relief conduit to the reservoir is once again opened by a second control edge, and then a complete relief of the reservoir is attained. It is during this phase that the metering of the fuel to be injected during the next supply stroke of the pump piston also takes place, via a magnetic valve. With an apparatus of this kind, it is advantageous that the fuel quantity per supply stroke of the pump piston that is actually to be injected can be metered exactly by means of a magnetic valve under pressure conditions that remain constant despite variable opening times.

29 Claims, 10 Drawing Figures

FUEL INJECTION PUMP FOR INTERNAL COMBUSTION ENGINES

BACKGROUND OF THE INVENTION

The invention is based on a fuel injection pump for internal combustion engines.

In a fuel injection pump of this kind, known from German Offenlegungsschrift No. 31 18 669, the position of a first control edge, which beyond a predetermined stroke opens the relief conduit leading to the reservoir, determines the quantity of fuel to be displaced into the reservoir, which following the simultaneously occurring end of the fuel injection by means of the pumping stroke of the pump piston is pumped by this pump piston over the remaining course of its stroke. During the intake stroke that follows, this fuel quantity is supposed to be drawn out of the reservoir once again, until the control edge again closes the relief conduit, at the same pump piston stroke position. The metering of the fuel injection quantity via a magnetic valve in the fuel supply conduit is effected by the opening up of the mouth of this conduit into the pump work chamber with the front edge of the pump piston, which happens only at the end of the intake stroke. In this pump piston position, the pressure in the pump work chamber has dropped to the vapor pressure value of the fuel. In the known apparatus, the control edge that controls the relief conduit is an oblique control edge disposed on the pump piston, and the pump piston can be rotated in order to vary the instant of the opening action. The end of injection can thus be controlled, and the injection onset can also be controlled, in combination with the fuel metering quantity that has been appropriately corrected as needed, in such a way that the injection phase takes place in an arbitrary portion of the pump piston pumping stroke. This apparatus has the disadvantage, however, that the diversion of the fuel into the reservoir and its refilling from the reservoir into the pump work chamber takes place at entirely different pressure levels, which has a substantial influence on the quantity of fuel that is actually returned to the pump work chamber. In other words, the quantity returned to the pump work chamber is not exactly the quantity that is pumped by the pump piston over the remaining course of its stroke, so that this fact too must be taken into consideration in metering the quantity of fuel that is to be injected. The error is a product of the various pressure drops at the cross section of the mouth of the relief conduit during the diversion on the one hand and then during the refilling operation on the other. The length of time required for discharging the reservoir is a further substantial influence, so that there is a factor of rpm dependency as well. The reservoir must also, for safety's sake, have a pressure limiting valve in order to avoid an overload, since for the above-stated reason pumping takes place continuously.

In the known apparatus, there are accordingly influences on the injection onset and the supply quantity that must be compensated for by an electrical control unit in a very complicated manner by means of appropriate correction values.

An embodiment is known from German Offenlegungsschrift No. 28 41 807. Here, in order to control the inlet in a distributor injection pump for example, a longitudinal groove is disposed on the rotating pump piston and the reservoir is disposed in the fuel supply conduit downstream of a check valve and connected with the control location of the relief conduit by means of a control edge provided on an annular slide that is displaceable on the pump piston. This control edge serves to set the fuel injection quantity, because after a substantially constant onset of supply by the pump piston the control edge opens the work chamber toward the reservoir beyond a supply stroke that is dependent on the position of the control edge. The delivery of fuel into the work chamber takes place via a variable cross section downstream of the check valve; however, this cross section functions in accordance with the required fuel quantity that is determined by the position of the annular slide. As a result of the operation of the variable cross section, in this embodiment, the ratio of the fresh air quantity to the fuel quantity to be injected is also kept constant by means of the adaptation of the recirculated exhaust gas quantity.

OBJECT AND SUMMARY OF THE INVENTION

The apparatus according to the invention has the advantage over the prior art that exact fuel metering is attained, in a fuel injection pump embodied as a distributor injection pump, and only that quantity of fuel actually to be injected is metered by the metering device, while the pressure conditions at the metering location remain unchanged. The diversion of remaining pumped fuel required at the end of the supply stroke of the pump piston or at the end of the steep cam elevation no longer affects the metering of a quantity, since because of the embodiment according to the invention, the diverted fuel quantity is assuredly returned to the work chamber no later than prior to the end of the fuel metering for the next supply stroke.

It is also particularly advantageous if the fuel quantity dispensing device is connected in a controlled manner with the pump work chamber via a filling groove only during metering and is not exposed to high pressure during the following supply stroke. A simpler structure is thereby attainable for the metering valves, which are preferably embodied as magnetic valves or other electrically controlled valves, so these metering valves no longer need to be able to withstand high pressure.

The embodiment according to features set forth herein is also particularly advantageous, where if the valve of the fuel quantity dispensing device should fail, and in particular if it should remain stuck in the open position, it is assured that the internal combustion engine will not be harmed by an overly large injection quantity, because in this case the fuel, metered into the pump work chamber in excess, is returned during the supply stroke of the pump piston without it being possible for the pressure to build up to the level necessary for injection.

The invention will be better understood and further objects and advantages thereof will become more apparent from the ensuing detailed description of preferred embodiments taken in conjunction with the drawings.

DESCRIPTION OF THE EXEMPLARY EMBODIMENTS

Figure 1:
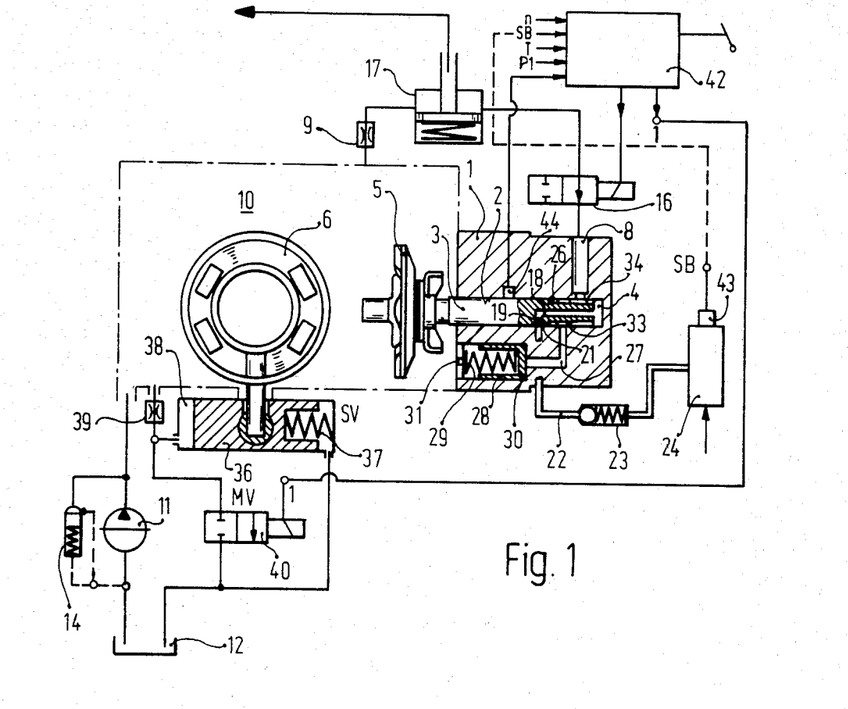
FIG. 1 is a schematic illustration of a first exemplary embodiment of the invention.

In the exemplary embodiment shown in FIG. 1, a bore 2 is provided in a pump housing 1, and a pump piston 3 encloses a pump work chamber 4 in this cylinder or bore 2. The pump piston 3 is driven by means not further shown via a cam disk 5, which travels on a cam ring 6 shown offset laterally beside the cam disk 5 and rotated by 90°, and thereby upon its rotational movement executes a reciprocating pumping movement with an intake stroke and a supply stroke. The supply of fuel to the pump work chamber 4 is effected via a fuel supply conduit 8, which communicates via a throttle 9 with a pump suction chamber 10. This latter is supplied with fuel from a fuel supply container 12 by means of a fuel feed pump 11, and the pressure in the pump suction chamber 10 is adjusted with the aid of a pressure control valve 14 that is connected in parallel with the fuel feed pump 11.

An electrically actuatable valve 16, which may for instance be a magnetic valve, is inserted as a fuel quantity dosing device in the fuel supply conduit. Upstream of this valve and downstream of the throttle 9, a pressure control valve 17 is provided, by means of which the fuel supply conduit downstream of the throttle 9 can be relieved upon the attainment of a predetermined pressure, which is lower than the pressure in the suction chamber 10, in such a manner that a constant inflow fuel pressure is present at the electrically actuatable valve.

Leading away from the pump work chamber 4 is a blind bore 18 disposed in the pump piston 3, from the end of which bore 18 a radial bore 19 leads outward to a distributor groove 21 on the jacket face of the pump piston, by means of which, upon the rotation of the pump piston and its supply stroke, supply lines 22 can be connected in succession with the pump work chamber 4. The supply lines, only one of which is shown here, are distributed about the circumference of the bore 2 in accordance with the number of cylinders of the associated internal combustion engine that are to be supplied, and each contains a relief valve 23 and each is connected with one injection valve 24.

In the wall of the pump piston 2, an annular groove 26 is also provided, which either communicates via a radial bore, not shown here, with the blind bore 18 and thereby with the pump work chamber 4 or communicates via a longitudinal groove in the jacket face of the pump piston with the pump work chamber. The annular groove 26 includes one limiting edge which is designated the first control edge. The limiting edge is disposed in such a way that beyond a maximal supply stroke the limiting edge comes to communicate with a mouth of a relief conduit 27, which leads from the jacket face of the cylinder bore 2 to a reservoir 28. The reservoir 28 has a piston 30 displaceable counter to the force of a restoring spring and is situated to receive the remaining fuel quantity pumped by the pump piston 3 beyond the point at which the relief conduit 27 is opened. The rear end of the reservoir 28 communicates via a bore 31 with the suction chamber 10, so that the suction chamber pressure likewise acts as a restoring force upon the piston 30.

Longitudinal grooves 33 also branch off from the annular groove 26, being disposedly distributed on the circumference of the pump piston in accordance with the number of supply strokes of the pump piston per rotation of the same such that they communicate with the mouth of the relief conduit 27 whenever the pump piston has preferably completed its intake stroke and is located in its lowest position at bottom dead center. This relationship is clearly shown in FIG. 3, which will be explained later herein.

The longitudinal grooves 33 discharge into filling grooves 34, which are likewise embodied as longitudinal grooves and begin at the front end of the pump piston, in such a manner that they are in continuous communication with the pump work chamber. However, they may also communicate with the pump work chamber via a connecting bore to the blind bore 18. The filling grooves, too, are distributed on the circumference of the pump piston in accordance wtih the number of cylinders to be supplied, and they are oriented with respect to the mouth of the fuel supply conduit 8 into the cylinder bore 2 such that they open the fuel supply conduit whenever the pump piston is located in its intake stroke phase.

In order to vary the instant of injection, an injection adjusting piston 36 is also provided, which is coupled with the cam ring 6 and is adjustable counter to the force of a restoring spring 37. The injection adjusting piston 36 thereby encloses a pressure chamber 38, which communicates via a throttle 39 with the pump suction chamber 10 and thus is subjected to the pressure in the pump suction chamber. To influence the onset of injection, the pressure chamber 38 can further be made to communicate with the intake side of the feed pump 11 via a magnetic valve 40 and can be relieved with the aid of this valve as well. The magnetic valve 40 is controlled by a control unit 42, which further serves to control the electrically actuatable valve 16 in the fuel supply conduit 8.

The control unit 42 functions in accordance with parameters which must be taken into consideration in the metering and timing of the fuel injection quantity. The control unit may, for instance, contain at least one family of curves in which set-point values for the quantity of fuel to be injected are contained in either direct or indirect form. In a manner known per se, such parameters as the rpm, temperature, air pressure and load or desired torque as indicated via the gas pedal may be taken into consideration. For the fuel quantity signal, an opening duration signal is generated, from which, in combination with an inflow cross section of constant, fixed size A which is defined in the fuel supply conduit 8 somewhere downstream of the pressure control valve 17, and also in combination with the pressure drop prevailing at this cross section, the fuel metering quantity is arrived at from the pressure difference maintained by the pressure control valve 17 and the vapor pressure in the pump work chamber 4. Especially for the triggering of the magnetic valve 16 signals of a needle stroke transducer 43 integrated into the injection valve 21 may as further parameters be detected for ascertaining the actual onset of injection. In particular, for controlling the injection timing adjuster and by means of the measurement thereby enabled of the actual fuel injection duration, these signals can also be used to obtain a quantity signal for controlling the fuel metering. Alternatively, a control signal for ascertaining the supply onset or the supply duration can be used via a pressure transducer, which is disposed in a suitable manner on the high-pressure side of the fuel injection pump. To ascertain the stroke position of the pump piston and thereby control exactly the position of the opening phase of the electrically actuatable valve with respect to the cam elevations or the pump piston stroke movements, a stroke or angle transducer 44, 44' may be associated with the pump piston or the cam disk. A transducer of this kind then furnishes a cam rise signal, for instance, to the control device 42 whenever the pump piston, from its lowest position at bottom dead center, begins its supply stroke. Such transducers are known and accordingly need not be described in detail here.

Figure 3:
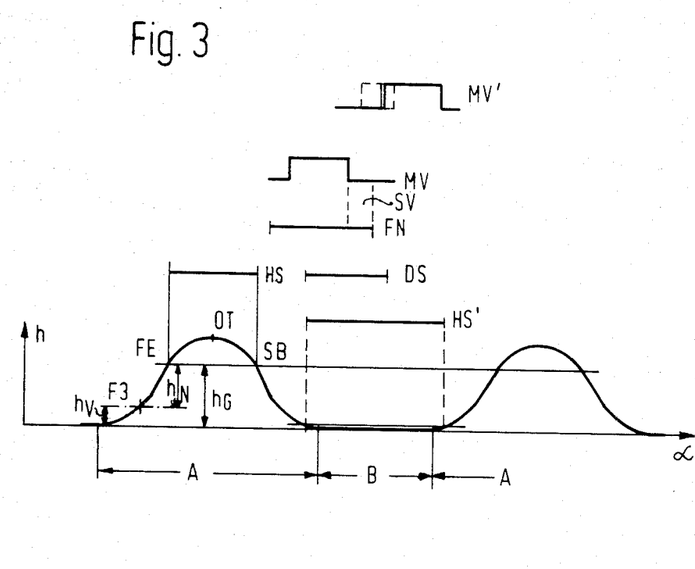
FIG. 3 is a diagram showing the movement of the pump piston and the control edges.

Referring now to FIG. 3, the mode of operation of the fuel injection pump shown in FIG. 1 will now be described. FIG. 3 shows the elevation curve of the pump piston over the rotary angle $\alpha$. By appropriately embodying the cam disk 5, a distance B is here provided between the individual pump piston strokes, with following intake strokes, over the respective distance A. The pump piston remains in its lowermost intake stroke position at bottom dead center over the rotary angle of this distance B.

Because of this cam embodiment, the pump piston begins its pumping for instance at point F3 after a pre-stroke hv; pumping is ended at point FE after a stroke $h_N$ as a result of the fact that the annular groove 26 of FIG. 1 has at this point opened the relief line 27. Beyond this point FE, the remaining fuel quantity pumped by the pump piston until its reversal of movement at top dead center OT is transferred into the reservoir 28. Upon the intake stroke that then follows, the fuel previously displaced into the reservoir 28 is fed back into the pump work chamber 4, until at the intake stroke onset SB the relief conduit 27 is disconnected from the annular groove 26. It should also be noted in connection with this process, however, that at point SB the entire fuel quantity diverted from point FE on has not yet reached the pump work chamber again, because in the range from FE to OT the reservoir is subjected to high pressure, which is then equalized in the reservoir counter to the force of the spring 29 and becomes only insignificantly higher than the pressure in the pump suction chamber 10. Based on this pressure level, the pump work chamber 4 is then refilled, and in accordance with the now-smaller pressure drop from the reservoir 28 to the pump work chamber, with the same overflow cross section in the rotary angle unit, less fuel can flow in.

Upon the intake stroke now following, from point SB on, the filling groove 34 opens up the fuel supply conduit 8, in fact via an angular course marked FN in FIG. 3. Within this opening duration, the quantity of fuel to be injected can now be delivered to the pump work chamber 4, with the aid of a timing control of the magnetic valve 16. The maximum opening duration MV of the magnetic valve is selected such that taking into consideration a maximum injection adjustment SV, the opening time of the magnetic valve remains within the opening duration of the fuel supply conduit, controlled by the filling groove 34. FN extends into the range B, where the pump piston assumes its position in bottom dead center UT.

Preferably within this range B, the relief conduit 27 is then opened once again, in that one of the longitudinal grooves 33, one limiting edge of which is designated the second control groove, is brought into coincidence with the mouth of this conduit into the bore 2. In this process, the reservoir 28 is offered the opportunity of expanding completely. This takes place under the influence of the restoring spring 29 and the fuel pressure in the suction chamber 10, which as already noted is higher than the inflow pressure of the fuel supply line 8. This process is further reinforced in that the work chamber 4, depending on the magnitude of fuel quantity metering, is not completely filled with fuel. Upon the supply stroke that then takes place, the supply onset FB is established such that a more or less long pre-stroke $h_V$ is executed before the high pressure required for injection is built up in the pump work chamber 4.

With this embodiment, a constant end and onset of injection are attained, the onset of injection being dependent on the quantity of fuel to be injected. A compensation for this influence and an additional control of the injection onset in accordance with other operating parameters is also possible by means of the injection adjusting apparatus 36-40. The actual injection onset can be detected by the transducer 43 or by a stroke transducer 44, in accordance with the signals of which and in accordance with other parameters the control device 42 generates a correction signal with which the magnetic valve 40 is triggered, for instance in clocked fashion with a variable pulse width. In this manner, the initially rpm-dependent injection onset adjustment is corrected by the rpm-dependent pressure of the suction chamber 10.

Figure 2:
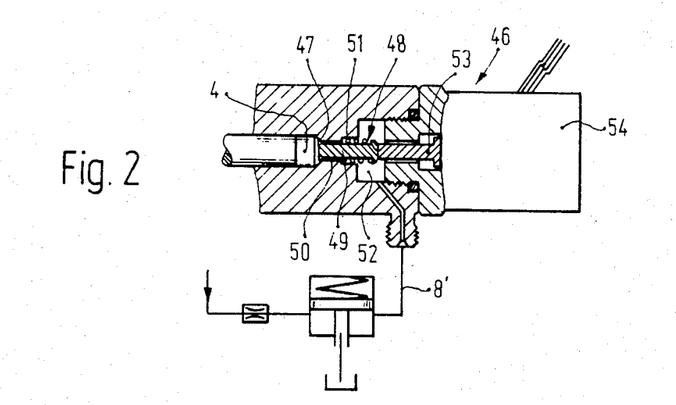
FIG. 2 shows a second exemplary embodiment, having an immediate introduction into the pump work chamber via an electrically actuated valve of the fuel to be metered.

In a second exemplary embodiment according to FIG. 2, the supply to the pump work chamber 4 is effected directly, without the interposition of a filling groove. To this end an electrically actuated valve 46 is provided on the end face of the pump work chamber, the valve 46 having a valve seat 47 that widens conically into the pump work chamber 4 as well as a valve closing member 48, which is correspondingly conically embodied on its end and protrudes into the pump work chamber 4 and there cooperates with the valve seat 47. The shaft 49 of the valve closing member 48 leads to the outside through the inflow bore 50 to the pump work chamber and is urged in the closing direction by a restoring spring 51. The inflow bore 50 is part of the fuel supply conduit 8' and discharges into a chamber 52 which communicates with the fuel supply line 8'. An actuation bolt 53 which is part of the armature of a magnet 54 protrudes coaxially with the valve closing member into this chamber 52, and upon the excitation of the magnet the actuation bolt 53 raises the valve closing member 48 from the valve seat 47, counter to the force of the restoring spring 51.

This embodiment has the advantage that should the fuel quantity dispensing device 46 fail, for instance in such a manner that the valve closing member 48 or the armature 53 becomes stuck, then although the pump work chamber 4 will still be continuously and completely filled with fuel, still this quantity of fuel, which would otherwise rapidly cause considerable damage to the engine supplied by this fuel injection pump, does not attain injection during the supply stroke of the pump piston. In this case, the fuel is returned by the pump piston through the leaking valve 46 back into the fuel supply conduit 8'. Accordingly, no injection of fuel takes place and the engine comes to a stop.

In the embodiment according to FIG. 2, the fuel metering times and the control of the reservoir can also be laid out differently. Preferably with the forms of embodiment shown in FIGS. 6–10 and to be described later herein, the pump work chamber 4 can be connected with the reservoir 28 by means of stroke control via a horizontal, annular second control edge shortly before reaching bottom dead center UT. Within the dwell time in UT before the pump piston begins to rise again, the metering can also take place by means of the magnetic valve, in which case the closing of the magnetic valve is preferably shifted to the end of the linear course B (see FIG. 3), or to the end of the opening time Hs' of the reservoir shortly before the pump piston begins to effect supply. In that case, the same pressure drop always prevails at the beginning of fuel metering by the magnetic valve 46, opening time MV'. The function of metering per unit of time which follows thereupon is also identical. Taking into consideration these facts, a very precise metering of the fuel quantity can be ascertained. Taking into consideration the necessary adjustment of injection onset, the control of the end of the metering phase MV' of the magnetic valve 46 is also possible with the aid of the stroke transducer 44, which detects the reversal of movement of the pump piston at bottom dead center, or in other words the actual beginning of the pump piston stroke.

Figure 4:
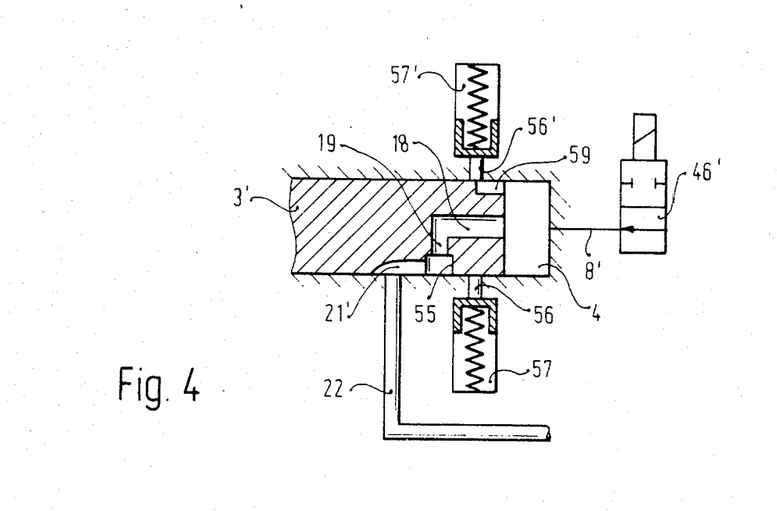
FIG. 4 shows a third exemplary embodiment, in which instead of a single reservoir, a plurality of reservoirs is used.

FIG. 4 shows another embodiment of the invention, in which instead of a single reservoir a plurality of reservoirs is present, each individual one of which is associated with one outlet of the pump piston. That is, there are exactly as many individual reservoirs distributed about the circumference of the pump piston as there are injection lines to be supplied by the pump piston. In FIG. 4, the pump work chamber 4 shown schematically is supplied with fuel in the same manner as in the exemplary embodiment of FIG. 2. To this end, the magnetic valve 46' is disposed in the fuel supply conduit 8' discharging into the pump work chamber 4. The pump piston here again has the blind bore 18, from which the radial bore 19 leads to the distributor groove 21'. The latter, as in FIG. 1, controls the supply lines 22. Deviating from the embodiment of FIG. 1, the distributor groove 21' in FIG. 1 has a horizontal limiting edge 55 toward the pump work chamber 4, serving as the first control edge to control one of relief conduits 56, 56'. The control edge 55 corresponds to the limiting edge on the side toward the pump work chamber of the annular groove 26 in FIG. 1, and the relief conduits 56, 56' correspond to the relief conduit 27 of FIG. 1. Each of the relief conduits 56 leads to a respective reservoir 57, 57', which like the reservoir 28 of FIG. 1 are both in a position to receive the quantity of fuel deviated beyond point FE (in FIG. 3). Further provided on the jacket face of the pump piston is a longitudinal groove 59, which discharges into the pump work chamber 4 and at a corresponding rotational and stroke position of the pump piston can likewise be brought into communication with the relief conduits 56, 56'. The relief conduits 56, 56', the control edge 55 and the longitudinal groove 59 are adapted to one another such that the control edge 55 upon each of the supply strokes of the pump piston opens one of the relief conduits 56 at a time at point FE and then recloses it when the pump piston moves the control edge 55 downward again during its intake stroke. During the continued downward movement of the pump piston 3', the longitudinal groove 59, the limiting edge of which can be called the second control edge, comes into coincidence with the entrance opening of the relief conduit 56'. If the associated reservoir 57' by the time of its disconnection from the pump work chamber 4 by means of the first control edge 55 moved past the relief conduit 56' has given up a large portion of the fuel stored in it, then the reservoir 57' can now expand completely via the longitudinal groove 59.

In a particularly advantageous manner, the transfer of the fuel quantity stored respectively in the individual reservoirs to the pump work chamber is effected in a controlled manner by means of the position of the grooves 21' and 59 or of the relief conduits 56, 56' at the circumference of the pump piston, respectively before the pump piston stroke by means of which pump piston stroke the cylinder, upon the previous supplying of which with fuel by means of the supply stroke of the pump piston the remaining quantity pumped by the pump piston had been diverted into precisely this reservoir, is again supplied with fuel. If this is not the case, as for instance in the embodiment of FIG. 1, then the following errors may occur: If a change in status results at an outlet of the pump work chamber, for instance such that a higher injection valve opening pressure results because of carbonization of outlet cross sections at the fuel injection nozzle, then the fuel injection quantity emerging from this outlet also varies. A correspondingly larger quantity, stored by means of a higher pressure in the pump work chamber, remains behind in the pump work chamber at point FE (FIG. 3), so that a correspondingly larger fuel quantity is also diverted into the reservoir 28; and during the following intake stroke, a correspondingly larger quantity is then returned into the pump work chamber as well. But this quantity, as an increased quantity with the fuel metering quantity remaining the same, is then injected into the next cylinder in sequence. An error in the fuel quantity adjustment thus occurs in the embodiment of FIG. 1. In the embodiment of FIG. 4, however, with the individual reservoirs, exactly the quantity that is stored there is delivered to the cylinder, upon the supplying of fuel to which the remaining fuel quantity pumped is transferred from point FE on into the individual reservoirs. Thus in this embodiment, increased or decreased fuel injection quantities are not carried along from one injection stroke to the next.

Figure 5:
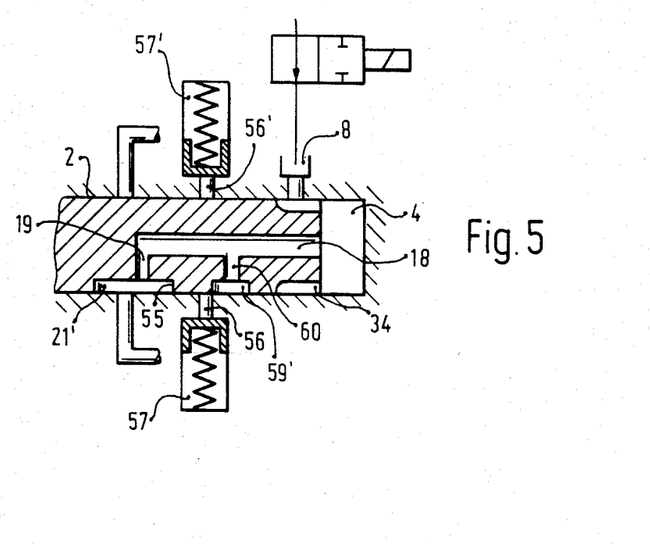
FIG. 5 shows a fourth exemplary embodiment, which is a modification of the exemplary embodiment of FIG. 4.

FIG. 5 shows a variant construction of the exemplary embodiment of FIG. 4. There, the individual reservoirs 57, 57' are again distributed on the circumference of the bore 2 guiding the pump piston. The individual reservoirs communicate respectively with the relief conduits 56, 56' located in a radial plane with respect to the pump piston axis. The relief conduits 56, 56' are also, as in the exemplary embodiment of FIG. 4, controlled by the distributor groove 21'. Differing from the exemplary embodiment of FIG. 5, the longitudinal groove 59' here is disposed below filling grooves 34 of the type described in connection with FIG. 1. The longitudinal groove 59' takes the form of a recess in the jacket face of the pump piston and communicates via a radial bore 60 with the blind bore 18. The connection with the radial bore 60 here replaces the direct discharging of the longitudinal groove 59 into the pump work chamber 4 of the exemplary embodiment of FIG. 4. This embodiment also enables a control of the fuel supply conduit 8 with the aid of the filling grooves 34 as in the exemplary embodiment of FIG. 1. In FIG. 5, the distributor groove 21' also replaces the function of the distributor groove 21 and the annular groove 26 of the exemplary embodiment of FIG. 1, which is made possible in that instead of only one reservoir, a plurality of reservoirs is provided.

Figure 6:
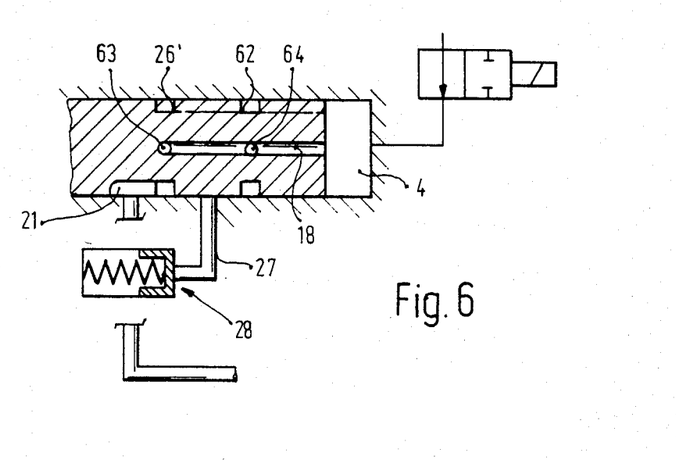
FIG. 6 shows, as a fifth exemplary embodiment, a modified form of embodiment of the embodiment of FIG. 1.

The exemplary embodiment according to FIG. 6 shows a variant construction of the exemplary embodiment of FIG. 1 in which the rotational control via the longitudinal grooves 33 is replaced by a reciprocating or stroke control. Instead of the longitudinal grooves, the exemplary embodiment according to FIG. 6 has a second annular groove 62 on the pump piston, which with the first annular groove 26' communicates via radial bores 63 and 64, respectively, with the blind bore 18. The first annular groove 26' is in continuous communication with the distributor groove 21, which is thus supplied with fuel via the radial bore 63. As in the exemplary embodiment according to FIG. 1, only a single reservoir 28 is provided, which is now made at the end of supply FE to communicate, via the first annular groove 26', with the pump work chamber and for the purpose of subsequent expansion in the vicinity of bottom dead center is provided with a connection via the second annular groove 62 to the work chamber 4. The relief conduit 27 leading to the reservoir 28 is opened shortly before bottom dead center is reached, so that it remains open over the entire duration of distance B or over the range HS' (see FIG. 3). In this range, the metering of the fuel quantity can also be effected by means of the magnetic valve, as already described. If the fuel is metered into the pump work chamber directly, that is, without control by the filling groove, then the second annular groove 62 can also be replaced by the front edge of the pump piston.

Figure 7:
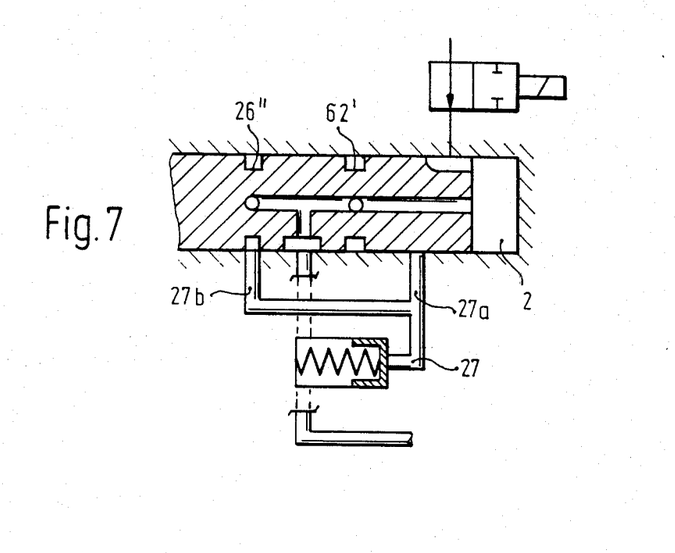
FIG. 7 shows, as a sixth exemplary embodiment, a second modified form of embodiment of the embodiment of FIG. 1.

FIG. 7 shows a further variant of the exemplary embodiment of FIG. 1. Here the difference is that the relief conduit 27 branches off into a partial conduit 27a and a partial conduit 27b. On the pump piston, as in the exemplary embodiment of FIG. 6, the first annular groove 26" and the second annular groove 62' are provided for controlling the relief conduit 27. The branches 27a and 27b then discharge into the cylinder 2 in such a way that during the pumping movement of the pump piston the two annular grooves 26" and 62' are located substantially between the two discharge points. Upon attaining UT, the branch conduit 27b is thus opened by the annular groove 26", here functioning as the second control edge, and upon attaining the diversion point FE the branch conduit 27a is opened by the second annular groove 62', here functioning as the first control edge.

Figure 8:
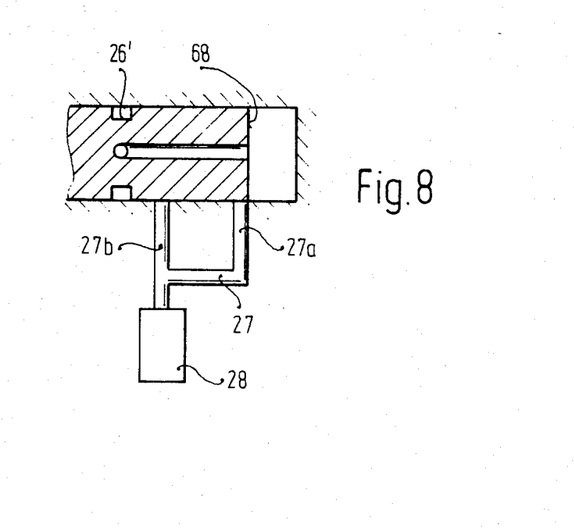
FIG. 8 shows a seventh exemplary embodiment.

As already mentioned with respect to FIG. 6, the second annular groove 62 may also be replaced by the front edge 68 of the pump piston, as shown in FIG. 8. Here again, the relief conduit 27 has branch conduits 27a and 27b.

Figure 9:
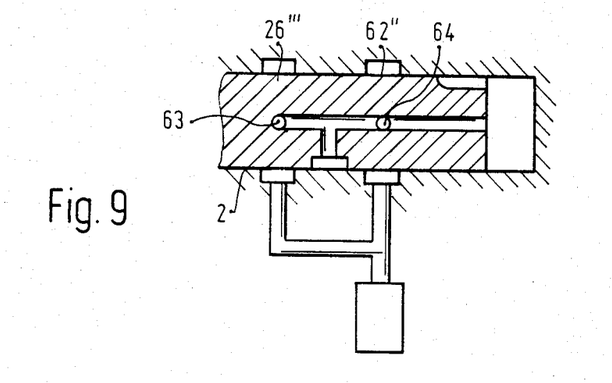
FIG. 9 shows an eighth exemplary embodiment, as a variant of FIG. 1.

FIG. 9 shows a variant realization in which the annular grooves 26" and 62' of FIG. 7 are disposed not on the piston but rather, as annular grooves 26'" and 62", which are disposed in the jacket face of the cylinder 2 and cooperate with the radial bores 63 and 64, to offer an example of a technically equivalent embodiment here.

Figure 10:
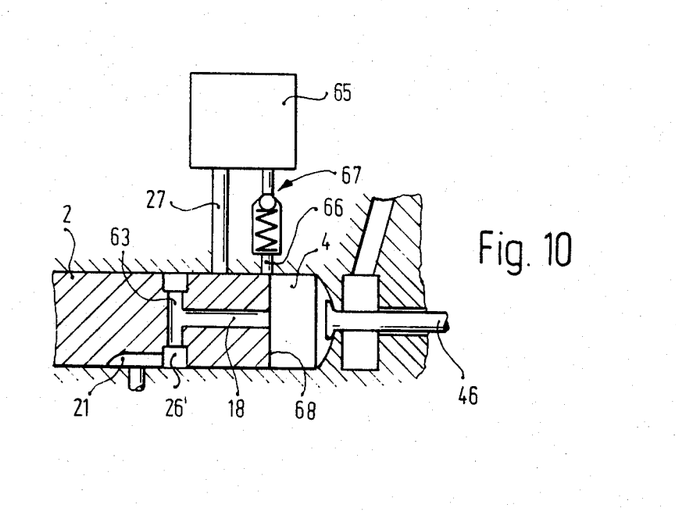
FIG. 10 shows a ninth exemplary embodiment having only one reservoir, which is connected with a second relief line controlled by the front edge of the pump piston.

In the exemplary embodiment of FIG. 10, which is similar to the exemplary embodiment of FIG. 8, only a single reservoir 65 is provided, which in this case is a volumetric reservoir, however; in other words, it is not a reservoir like those shown in the foregoing exemplary embodiments having an adjustable wall. The pump work chamber 4 in this exemplary embodiment is supplied with fuel in the same manner as in the exemplary embodiment of FIG. 2, that is, by means of a valve 46 opening into the pump work chamber 4. The volumetric reservoir 65 communicates with the cylinder 2 via the relief line 27, which here is controllable by the first annular groove 26', in the same manner as with the exemplary embodiment of FIGS. 6 or 8. The first annular groove 26' communicates on the one hand with the distributor groove 21 and on the other, via the radial bore 63, with the blind bore 18 in the pump piston. A second relief conduit 66 coming from the volumetric reservoir 65 also discharges into the cylinder 2, and in this second relief conduit 66 is disposed a check valve 67 opening toward the cylinder 2. This second relief conduit 66 is controlled and then opened by the front edge 68 of the pump piston acting as the second control edge whenever the pump piston is located near bottom dead center. This embodiment takes into consideration the fact that a piston reservoir having a restoring spring 29 such as that shown in FIG. 1 is exposed to very severe strains whenever internal combustion engines that function with direct injection are to be supplied by the fuel injection pump under discussion. At high rpm, with high numbers of cylinders and in particular at high injection pressures and with a relatively short injection duration, conditions that are necessary in the operation of direct injection engines, the piston reservoir may under some circumstances no longer follow along with the high frequency. The reservoir spring is exposed to severe impact stresses at the diversion point. With the use of a volumetric reservoir, the danger in operation caused by failure of the restoring spring is eliminated. In that case, however, the reservoir inflow and outflow must be separate, because means are required in the reservoir outflow such as the check valve provided, or a throttle, or both, which prevent formation of a hollow space in the reservoir upon the outflow of the contents of the reservoir. The control of a volumetric reservoir of such a kind may naturally be accomplished similarly to the stroke or rotational control means described for the foregoing exemplary embodiments.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A fuel injection pump comprising a housing, a cylinder in said housing, at least one work chamber, in said cylinder, a pump piston enclosing said work chamber in said cylinder, a plurality of fuel injection supply lines in said housing connectable in turn with said work chamber during a pump stroke of said pump piston, a fuel supply conduit in communication with said work chamber during at least part of a rest position of said pump piston between a suction stroke and a pump stroke, a fuel quantity dispensing valve in said fuel supply conduit upstream from said work chamber which has a time controlled opening period, at least one relief conduit in said housing in communication with said work chamber and at least one reservoir, said relief conduit being operably opened up from a predetermined stroke of said pump piston during its pump stroke by a first control edge on said pump piston in synchronism with said pump stroke of said pump piston, said first control edge being formed by a recess disposed on a jacket face of said pump piston which rotates in synchronism with a pump piston drive means, said pump piston being guided within said cylinder thereby simultaneously serving as a fuel distributor, said pump piston having a distributor opening communicating with said pump work chamber, said distributor opening, during rotation of said pump piston, and during a pump stroke registering in turn with one of said fuel injection supply lines thus brought in communication with said work chamber, and at least one second edge on said pump piston, said at least one second edge on said pump piston functioning to provide communication between said pump work chamber and said at least one reservoir during at least part of said rest position of said piston and said at least one second control edge is disposed on said pump piston such that a connection with said reservoir is closed prior to a subsequent pump stroke of said piston and prior to an injection of fuel into said injection supply line.

2. A fuel injection pump as defined by claim 1, in which said first and second control edges comprise a pair of limiting edges, in particular a mouth cross section on said pump piston and on said cylinder guiding said pump piston, and a limiting edge on a side of the pump piston controls a connection with the pump work chamber.

3. A fuel injection pump as defined by claim 2, in which at least one of the control edges extends at right angles to a longitudinal axis of the pump piston.

4. A fuel injection pump as defined by claim 2, in which at least one of the control edges is a limiting edge of a longitudinal groove on the pump piston.

5. A fuel injection pump as defined by claim 3, in which at least one of the control edges is a limiting edge of a longitudinal groove on the pump piston.

6. A fuel injection pump as defined by claim 3, in which at least one of the control edges is an annular limiting edge located in a sectional plane at right angles to a longitudinal axis of said pump piston.

7. A fuel injection pump as defined by claim 3, in which the second control edge is embodied by a front edge of the pump piston.

8. A fuel injection pump as defined by claim 3, in which a mouth of the at least one relief conduit as the sole connection with the at least one reservoir is located in a radial plane that is located between the first and the second control edge.

9. A fuel injection pump as defined by claim 4, in which a mouth of the at least one relief conduit as the sole connection with the at least one reservoir is located in a radial plane that is located between the first and the second control edge.

10. A fuel injection pump as defined by claim 5, in which a mouth of the at least one relief conduit as the sole connection with the at least one reservoir is located in a radial plane that is located between the first and the second control edge.

11. A fuel injection pump as defined by claim 6, in which a mouth of the at least one relief conduit as the sole connection with the at least one reservoir is located in a radial plane that is located between the first and the second control edge.

12. A fuel injection pump as defined by claim 7, in which a mouth of the at least one relief conduit as the sole connection with the at least one reservoir is located in a radial plane that is located between the first and the second control edge.

13. A fuel injection pump as defined by claim 8, in which one of the control edges is embodied as a limiting edge of the distributor opening.

14. A fuel injection pump as defined by claim 3, in which said relief conduit is provided, with two mouths and the first control edge and the second control edge are located during an effective supply stroke of the pump piston between these two mouths.

15. A fuel injection pump as defined by claim 14, in which at least one of the control edges is embodied as a limiting edge of the distributor opening.

16. A fuel injection pump as defined by claim 1, in which the at least one reservoir has a wall movable counter to a restoring force.

17. A fuel injection pump as defined by claim 1, in which the fuel quantity dispensing device is a valve functioning with electromechanical means, which is controlled by an electrical control device, and that the fuel supply conduit leads away from a constant-pressure fuel source.

18. A fuel injection pump as defined by claim 17, in which the fuel supply conduit can be made to communicate via at least one filling groove on the pump piston with the pump work chamber, and the opening time of the fuel supply conduit controlled by the filling groove is longer than the maximum opening time of the valve.

19. A fuel injection pump as defined by claim 17, in which an outlet of the valve discharges directly into the pump work chamber.

20. A fuel injection pump as defined by claim 19, in which the valve has a valve closing member opening in the direction of the pump work chamber.

21. A fuel injection pump as defined by claim 17, in which the fuel metering quantity is determinable by means of the opening time of the valve, and an end point of the opening time is controllable by a stroke position transducer of the pump piston via the control device.

22. A fuel injection pump as defined by claim 17, in which to make use of a fuel source, the fuel supply conduit is made to communicate with a pump suction chamber of the injection pump via an uncoupling throttle, downstream of which a constant-pressure valve is disposed, by means of which the fuel supply conduit can be relieved in order to maintain a constant pressure.

23. A fuel injection pump comprising a housing, a cylinder in said housing, at least one work chamber, in said cylinder, a pump piston enclosing said work chamber in said cylinder, a plurality of fuel injection lines in said housing connectible in turn in communication with said work chamber during a pump stroke of said pump piston, a fuel supply conduit in communication with said work chamber during at least part of a rest position of said pump piston between a suction stroke and a pump stroke, a fuel quantity dispensing valve in said fuel supply conduit upstream from said work chamber which has a time controlled opening period, a plurality of relief lines in said housing disposed by distributed about a circumference of said cylinder in a radial plane which discharge into said cylinder in communication with said work chamber in accordance with a number and distribution of the supply conduits and a plurality of reservoirs, said relief conduit being operably opened during a predetermined stroke of said pump piston during a pump stroke by a first control edge in synchronism with said pump stroke on said pump piston, said first control edge being disposed on a jacket face of a pump piston which rotates in synchronism with a pump piston drive means, said pump piston being guided within said cylinder thereby simultaneously serving as a fuel distributor, said pump piston having a distributor opening communicating with said pump work chamber, said distributor opening during rotation of said pump piston, and during a compression stroke registering in turn with one of said fuel injection supply lines thus brought in communication with said work chamber, and at least one second edge on said pump piston, said at least one second edge on said pump piston functioning to provide communication between said pump work chamber and one of said plurality of reservoirs during at least part of said rest position of said piston, and said at least one second control edge is disposed on said pump piston such that a connection with said reservoir is closed prior to a subsequent pump stroke of said piston and prior to an injection of fuel into said injection supply line.

24. A fuel injection pump as defined by claim 23, in which each of the relief lines discharging into the cylinder leads to a reservoir associated only with said relief line and the control edges controlling the relief lines are limiting edges of recesses, limited in the radial direction, on the pump piston, which recesses communicate with the pump work chamber.

25. A fuel injection pump as defined by claim 23, in which said control edges each comprise a pair of limiting edges, in particular mouth cross sections on said pump piston and on said cylinder guiding said pump piston, and the limiting edge on the side of the pump piston controls a connection with the pump work chamber.

26. A fuel injection pump as defined by claim 25, in which at least one of the control edges extends at right angles to a longitudinal axis of the pump piston.

27. A fuel injection pump comprising a housing, a cylinder in said housing, at least one work chamber, in said cylinder, a pump piston enclosing said work chamber in said cylinder, a plurality of fuel injection supply lines in said housing connectible in turn in communication with said work chamber during a pump stroke of said pump piston, a fuel supply conduit in communication with said work chamber during at least part of a rest position of said pump piston between a suction stroke and a pump stroke, a fuel quantity dispensing valve in said fuel supply conduit upstream from said work chamber which has a time controlled opening period, at least one relief conduit in said housing in communication with said work chamber and a reservoir, said reservoir being embodied as a volumetric reservoir which communicates with a first relief line controlled by a first control edge and with a second relief line which is controlled by a second control edge, said relief conduit being operably opened during a predetermined stroke of said pump piston during a pump stroke by said first control edge in synchronism with said pump stroke of said pump piston, said first control edge being disposed on a jacket face of said pump piston which rotates in synchronism with a pump piston drive means, said pump piston being guided within said cylinder thereby simultaneously serving as a fuel distributor, said pump piston having a distributor opening communicating with said pump work chamber, said distributor opening during rotation of said pump piston, and during a compression stroke registering in turn with one of said fuel injection supply lines thus brought in communication with said work chamber, and at least one second edge on said pump piston, said at least one second edge on said pump piston functioning to provide communication between said pump work chamber and said reservoir during at least part of said rest position of said piston and said second control edge is disposed on said pump piston such that a connection with said reservoir is closed prior to a subsequent pump stroke of said piston and prior to an injection of fuel into said injection supply line.

28. A fuel injection pump as defined by claim 27, in which a throttling element that is effective in the flow direction toward the pump work chamber is disposed in the second relief line.

29. A fuel injection pump as defined by claim 28, in which the throttling element is a check valve opening toward the pump work chamber.

* * * * *